US008467171B2

(12) United States Patent
Brown et al.

(10) Patent No.: US 8,467,171 B2
(45) Date of Patent: Jun. 18, 2013

(54) TEMPORARY POWER DISTRIBUTION PANEL

(76) Inventors: Victoria Vogt Brown, Atlanta, GA (US); John Denis Lewis, Houston, TX (US); Michael A. Reed, Buford, GA (US); Philip M. Dewey, Jonesboro, GA (US)

( * ) Notice: Subject to any disclaimer, the term of this patent is extended or adjusted under 35 U.S.C. 154(b) by 698 days.

(21) Appl. No.: 12/109,930

(22) Filed: Apr. 25, 2008

(65) Prior Publication Data

US 2009/0268380 A1    Oct. 29, 2009

(51) Int. Cl.
*H02B 1/26* (2006.01)
*A62C 25/00* (2006.01)
*G08B 13/14* (2006.01)

(52) U.S. Cl.
USPC ............... 361/625; 169/51; 116/99; 361/641; 340/571

(58) Field of Classification Search
USPC ...................... 361/625, 654; 169/51
See application file for complete search history.

(56) References Cited

U.S. PATENT DOCUMENTS

| 3,827,039 | A | * | 7/1974 | Agnese | 340/586 |
| 4,418,336 | A | * | 11/1983 | Taylor | 340/571 |
| 4,519,657 | A | | 5/1985 | Jensen | |
| 5,212,623 | A | | 5/1993 | Wilson et al. | |
| 5,400,212 | A | | 3/1995 | Hanson | |
| 5,404,266 | A | | 4/1995 | Orchard et al. | |
| 5,418,683 | A | | 5/1995 | Orchard et al. | |
| 5,544,003 | A | | 8/1996 | Vaughan | |
| 5,726,507 | A | | 3/1998 | Tipton | |
| 5,838,078 | A | | 11/1998 | Tipton | |
| 6,266,233 | B1 | | 7/2001 | O'Regan | |
| 6,956,733 | B2 | * | 10/2005 | Beasley et al. | 361/641 |
| 2003/0058645 | A1 | | 3/2003 | Hincher, Sr. | |
| 2007/0230094 | A1 | | 10/2007 | Carlson | |
| 2007/0268655 | A1 | | 11/2007 | Price et al. | |

FOREIGN PATENT DOCUMENTS

GB    2343375    5/2000

OTHER PUBLICATIONS

International Search Report, dated Dec. 8, 2009, 14 pages, from the Patent Cooperation Treaty Office.

* cited by examiner

*Primary Examiner* — Zachary M Pape
(74) *Attorney, Agent, or Firm* — Gardner Groff Greenwald & Villanueva, PC (57) ABSTRACT

A temporary power distribution panel for use at a construction site comprises a box-like cabinet with an interior, an exterior, and a rear side having upper and lower hangers positioned on the rear side of the cabinet for securing the cabinet to a post, wall, or wall stud. The panel further comprises an electric power inlet for electrically coupling the cabinet to a source of electric power and a plurality of electric power outlets for providing electric power to the construction site and internally coupled to the electric power inlet. The temporary power distribution panel further includes an interior fire extinguisher closet and an emergency alarm bell.

8 Claims, 6 Drawing Sheets

TEMPORARY POWER DISTRIBUTION PANEL

TECHNICAL FIELD

The present invention relates generally to the field of power distribution devices and more particularly to portable or temporary power distribution cabinets or panels for use at construction sites.

BACKGROUND OF THE INVENTION

Construction projects require electric power to be distributed to various tools and lights. Once normal electric service is provided to a building and the electric wiring for the building is completed, providing electric power for tools and lights is simple. But prior to the completion of the buildings' electric wiring and/or prior to the establishment of regular electric service, providing electric power to the construction site is more problematic. Several prior art devices have been developed to provide temporary power to users at a construction site or related location.

For example, U.S. Pat. No. 5,544,003 issued to Vaughn teaches a portable electrical distribution panel with a wheeled frame, intended for use in asbestos removal. The Vaughn patent teaches a power panel in which power to be supplied through a single inlet cord is routed through breakers. Output power is made available through weather-proof receptacle boxes.

A further example is shown in U.S. Pat. No. 5,212,623 issued to Wilson et al., which teaches a portable power distribution cabinet for construction sites, to provide power before regular service is established. The cabinet in Wilson et al. is described to have feet for resting on the floor and optional eyelets for hanging the cabinet on a wall or from a structure.

A third example is shown in U.S. Pat. No. 5,406,266 issued to Orchard et al. The Orchard et al. patent teaches a temporary power center for construction sites and includes a monitoring meter, at least one 110-volt outlet, a 3-phase outlet and a cover for the outlets. The Orchard et al. power center is designed to be mounted to a post.

A further example is shown in U.S. Pat. No. 5,418,683 issued to Orchard et al., which teaches a temporary power center having a plug connection to provide power and at least one outlet.

Another need often seen at construction sites is for safety equipment or alarms. For example, in the construction of a multifloor office building, it is common to use an air horn at the construction management trailer to signal to workers to evacuate the building because of an emergency. If there is an emergency on one of the floors, typically a worker would notify a supervisor, who would call down to the management trailer via phone or radio, alerting them to the emergency. A ground-based employee would then sound the emergency horn. This has the disadvantage of requiring action by multiple people before an emergency alarm (horn) can be sounded.

Consequently, while attempts have been made in the prior art to provide temporary power panels, a need yet remains for a temporary power panel or cabinet which can also improve construction site safety. It is to the provision of such a temporary power panel that the present invention is primarily directed.

SUMMARY OF THE INVENTION

In a first preferred form, the present invention comprises a temporary power distribution panel for use at a construction site. The power distribution panel preferably comprises a box-like cabinet with an interior, an exterior, and a rear side. The box-like cabinet defines an interior fire extinguisher closet for receiving a fire extinguisher therein. The power distribution panel further comprises an electric power inlet for electrically coupling the cabinet to a source of electric power. A plurality of electric power outlets are internally coupled to the electric power inlet and are provided for supplying electric power to the users at a construction site.

Preferably, the power distribution panel includes an emergency alarm bell that can be activated directly by a worker. Preferably, an emergency alarm bell arming switch is provided for activating the emergency alarm bell. It is contemplated that the arming switch can optionally include shutoff deterrence to require additional time and difficulty in disarming the emergency alarm bell (to minimize operation of the emergency alarm bell as a prank).

In a second preferred form, the present invention comprises a temporary power distribution panel for use at a construction site. The power distribution panel preferably comprises a box-like cabinet with an interior, an exterior, and a rear side. The power distribution panel further comprises an electric power inlet for electrically coupling the cabinet to a source of electric power. A plurality of electric power outlets are internally coupled to the electric power inlet and are provided for supplying electric power to the users at a construction site. Preferably, the power distribution panel includes an emergency alarm bell that can be activated directly by a worker.

Preferably, an emergency alarm bell arming switch is provided for activating the emergency alarm bell. It is contemplated that the arming switch can optionally include shutoff deterrence to require additional time and difficulty in disarming the emergency alarm bell (to minimize operation of the emergency alarm bell as a prank).

The box-like cabinet defines an interior fire extinguisher closet for receiving a fire extinguisher therein. Optionally, the power distribution panel can include a removable partition for defining the fire extinguisher closet and for protecting the remainder of the interior of the cabinet from exposure. Optionally, the power distribution panel can include a movable door for covering and uncovering the fire extinguisher closet.

Also optionally, a power distribution panel according to the present invention can comprise upper and lower hangers positioned on the rear side of the cabinet for hanging the cabinet onto a wall or post. Advantageously, the upper hanger can be sized and shaped to comprise a convenient carrying handle and the lower hanger can comprise a support leg. Power distribution panels according to the present invention can comprise additional support legs, with the support legs together being provided for supporting the interior of the cabinet several inches or more above the ground or floor.

Also further contemplated, a power distribution panel according to the present invention can comprise a heat sensor connected to the alarm bell and can automatically activate the alarm bell upon detecting a particular temperature.

Also further contemplated, a power distribution panel according to the present invention can comprise at least one foot mounted to the base of the panel. Each foot is contemplated to have at least one caster for ease of transport.

Also further contemplated, a power distribution panel according to the present invention can comprise a relay switch contemplated to connect the panel to a plurality of further devices located on a worksite and in a building.

Also further contemplated, a power distribution panel according to the present invention can comprise a wireless communication device contemplated to wirelessly connect the panel to a plurality of further devices on a worksite, including a remote user.

Power distribution panels according to the present invention have the advantages of being readily deployed on walls, on studs, on posts, or even upon the ground. Such power distribution panels provide a convenient source of temporary electric power, while providing important safety functions (emergency alarms and/or fire extinguishers). Advantageously, the power distribution panels can be moved from site to site quickly and easily.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
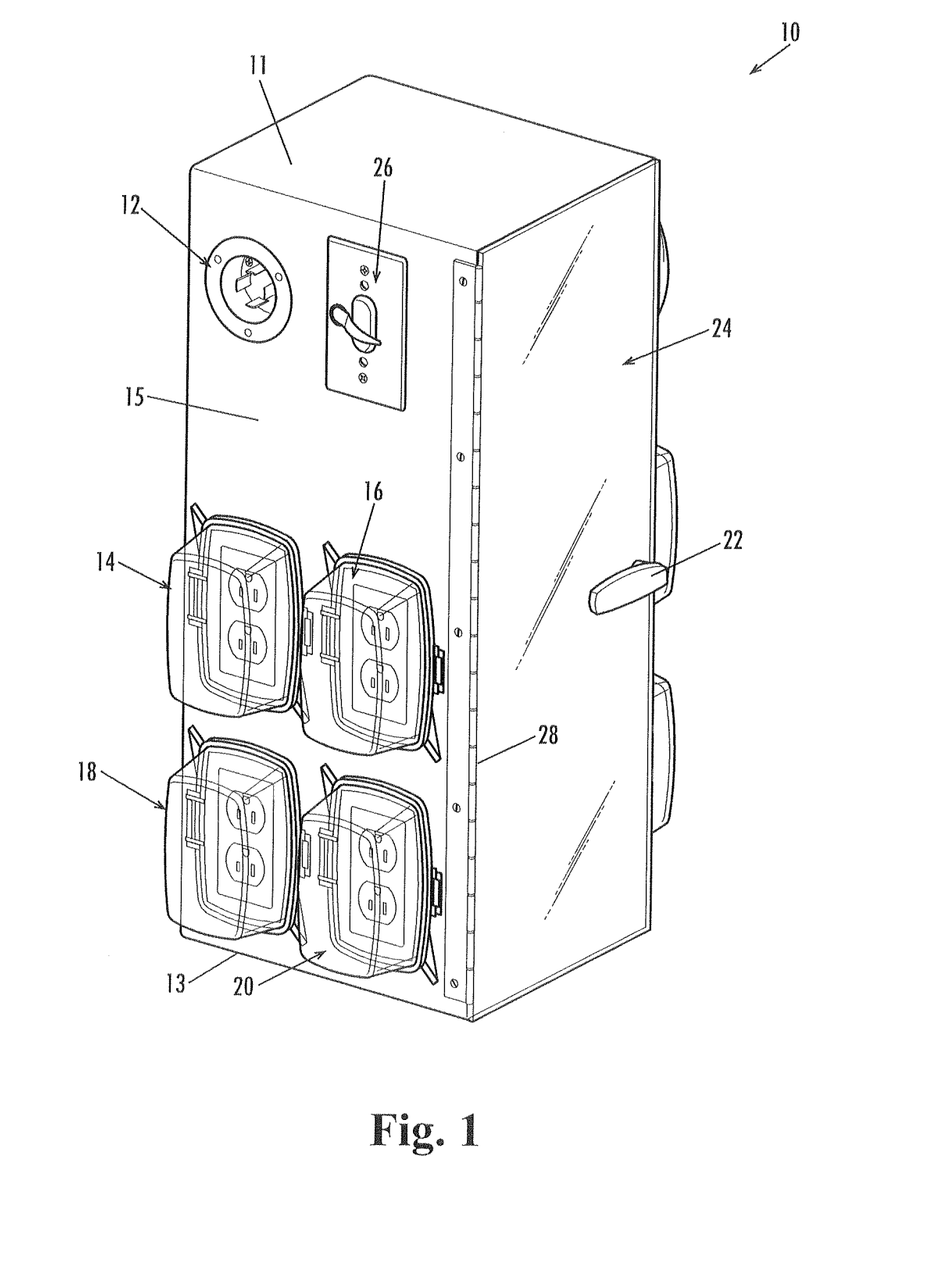
FIG. 1 is a perspective view of a temporary power distribution panel according to a preferred commercial embodiment of the invention, as viewed from the left side and showing the front side door.

With reference now to the drawing figures, wherein like reference numbers represent corresponding parts throughout the several views, FIG. 1 shows a perspective view of a commercial embodiment of a temporary power distribution panel (or cabinet) 10 according to a preferred form of the invention, and shown as viewed from the left side showing the front side door 24 of the panel 10. The panel 10 preferably has a box-like shape and structure. The panel 10 has a top, bottom and four sides, all of which are flat. The top surface, being large and flat, provides a good location for placing battery chargers for charging rechargeable batteries used in cordless power tools. The panel 10 is contemplated to be constructed of a tough, rigid material, such as sheet metal or plastic. Plastic has the advantage of provided electrical insulation. One particularly suitable plastic is solid sheet PVC. In the commercial embodiment shown, the sheet PVC is formulated (or otherwise treated) to be UV-stabilized. Those skilled in the art will recognize, however, that alternative materials can be used as desired.

The temporary power panel 10 is configured to have or define an interior storage space to be used for storing a common fire extinguisher, referred to herein sometimes as a fire extinguisher closet. As shown, the interior storage space is protected by a movable door 24 which may be opened by using a handle 22. The movable door 24 is mounted to the side of the cabinet using a hinge 28 (shown here as a piano hinge, although other styles of hinges can be employed). The movable door can be moved between and opened position for exposing the interior of the fire extinguisher closet and a closed position concealing the same.

A master electric power inlet 12 is shown on one of the sides of the cabinet 10. The power inlet 12 is in the form of a recessed coupling or receptacle with male terminals for engaging a female plug or coupling on the end of a power supply cord. Thus, the power introduced to the power inlet 12 is provided by an external electric power source. It is contemplated that the power inlet 12 can accommodate a 110 VAC source of electricity, however, the inlet could be adapted for receiving different voltages, as desired. Further, to use the temporary power panel with voltages other than 110V, but still be able to produce output voltages of 110V, the power inlet 12 can incorporate a step-down transformer in order to accommodate a larger voltage amount, such as 220 volt. Alternatively, the voltage step down function, if needed, can be provided by componentry between the power inlet 12 and the power outlets.

An alarm activation switch 26 is shown located on the panel 10. The alarm activation switch 26 activates and deactivates an alarm bell as further described below. The alarm activation switch 26 is further contemplated to be somewhat prank-deterrant through the provision of a re-set wire located within the panel 10. The reset wire must be pulled to deactivate the alarm, once the alarm has been sounded. This prevents the quick on and off of the switch (and the alarm bell), thereby discouraging those who would use the alarm as a prank.

A plurality of power outlets 14, 16, 18, and 20 are shown mounted to the side of the panel 10. These power outlets 14, 16, 18, and 20 provide standard 110V AC electric power (or in an alternative desired voltage, as desired). Each power outlet 14, 16, 18, and 20 is equipped to receive and engage a common male extension cord input (both two and three prong). Each power outlet 14, 16, 18, and 20 is protected from the elements by a weatherproof cover which may be temporarily opened for use.

Figure 2:
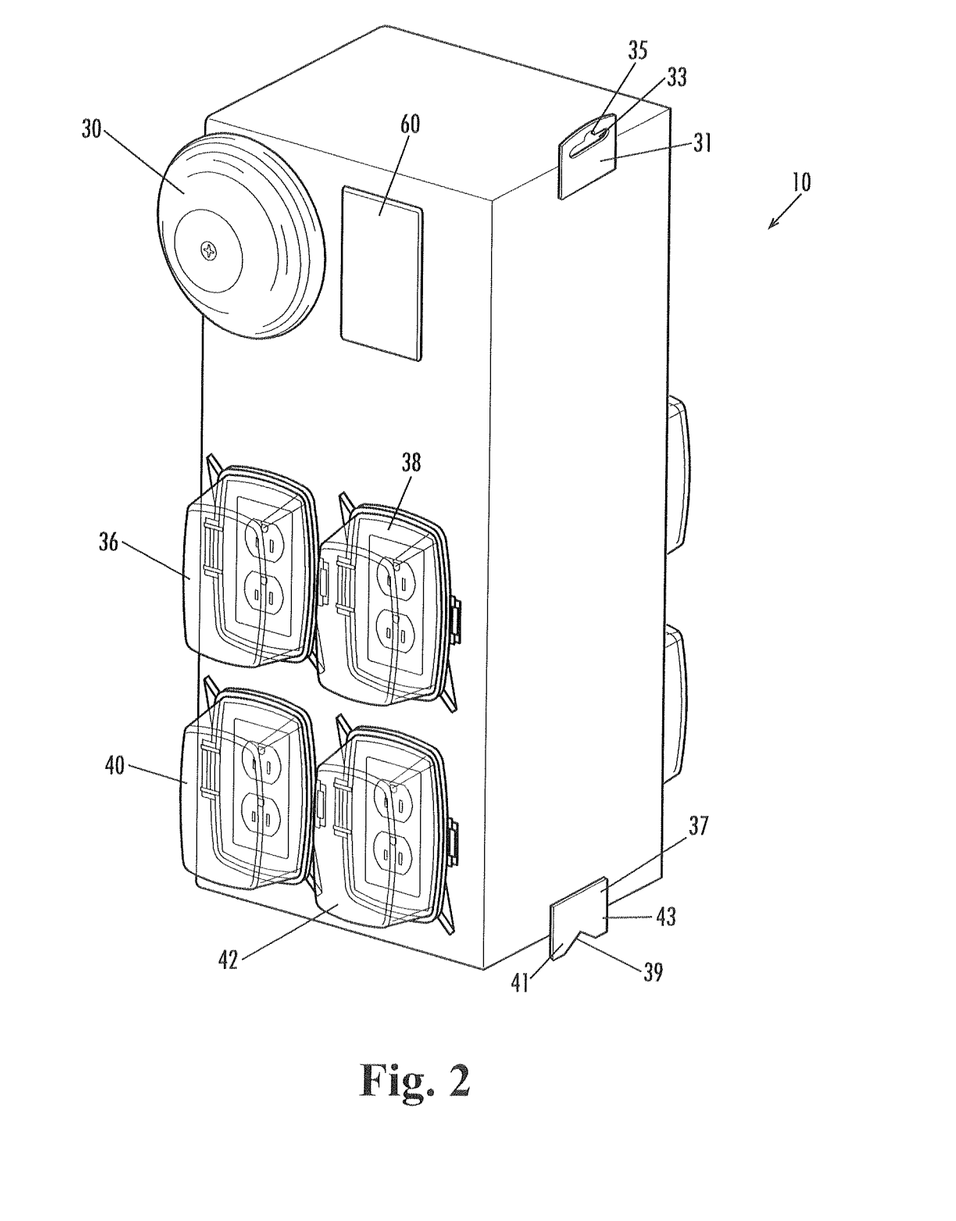
FIG. 2 is a perspective view of the temporary power distribution panel of FIG. 1, as viewed from the right side and showing the rear side hangers.

Referring now to FIG. 2, a perspective view of the temporary power distribution panel 10 as viewed from the right side, this figure shows the rear side hangers 31 and 37. As shown, the rear side of the panel 10 is opposite the door 24. The panel 10 is contemplated to be temporarily mounted or hung on a wall, on a wall stud, or on a post. This is accomplished with the use of the upper hanger 31 and the lower hanger 37. The upper hanger 31 has a handle opening 33 for receiving a hand therein so that a user may comfortably carry the panel 10. There is a small cut-out section or central notch 35 located at the top of the handle opening 33. When mounted to a wall, wall stud, or post, the user will first insert a nail, screw or equivalent hanging device into the wall, wall stud, or post. The user then sets the position the handle opening 33 over the nail and the nail secures the cabinet in place, with the nail captured within the notch 35. The lower hanger 37 has two legs or feet 41, 43 which are separated by a V-notch 39. The user inserts a second nail into a wall, wall stud, or post at a location which is received in the V-notch 39. As such, when mounted, the panel 10 is supported by a nail in the handle 33 of the upper hanger 31 and by a nail in the V-notch 39 in the lower handle 37. The nails (or screws) should be spaced apart from one another the same or similar distance as that between the lower V-notch 39 and the upper notch 35. A convenient way to do this is to insert a lower nail or screw and then temporarily mount the cabinet on the lower nail/screw using the lower notch 39. The upper notch 35 can then be used to mark the location for the upper nail/screw.

As further shown, an alarm bell 30 is mounted to a side of the panel 10. The alarm bell 10 is activated and deactivated by the switch 26 discussed above. The alarm bell 30 and switch 26 are electrically connected internally. In order to fully deactivate the alarm bell 30 using the switch 26, a user must first turn the switch 26 to the OFF position and open the door to gain access to the interior and pull a re-set wire located within the interior (in the fire extinguisher closet). The wire is connected to one of the contacts of the switch such that when the switch is turned to the ON position, one of the contacts is moved as well. In order to deactivate the switch (and the alarm bell), the contact must be moved back to the OFF position. The string is mechanically connected to the contact in such as to allow the user to move the contact back to the OFF position by pulling on the string. To activate the alarm bell 30 and the switch 26, a user simply pushes the switch 26 into the ON position.

A second set of power outlets (power receptacles) 36, 38, 40, and 42 are located on the opposite side of the panel 10 from the above described outlets 14, 16, 18, and 20. The second set of power outlets can be identical to the first ones and have two-prong or three-prong inputs and weatherproof covers.

Figure 3:
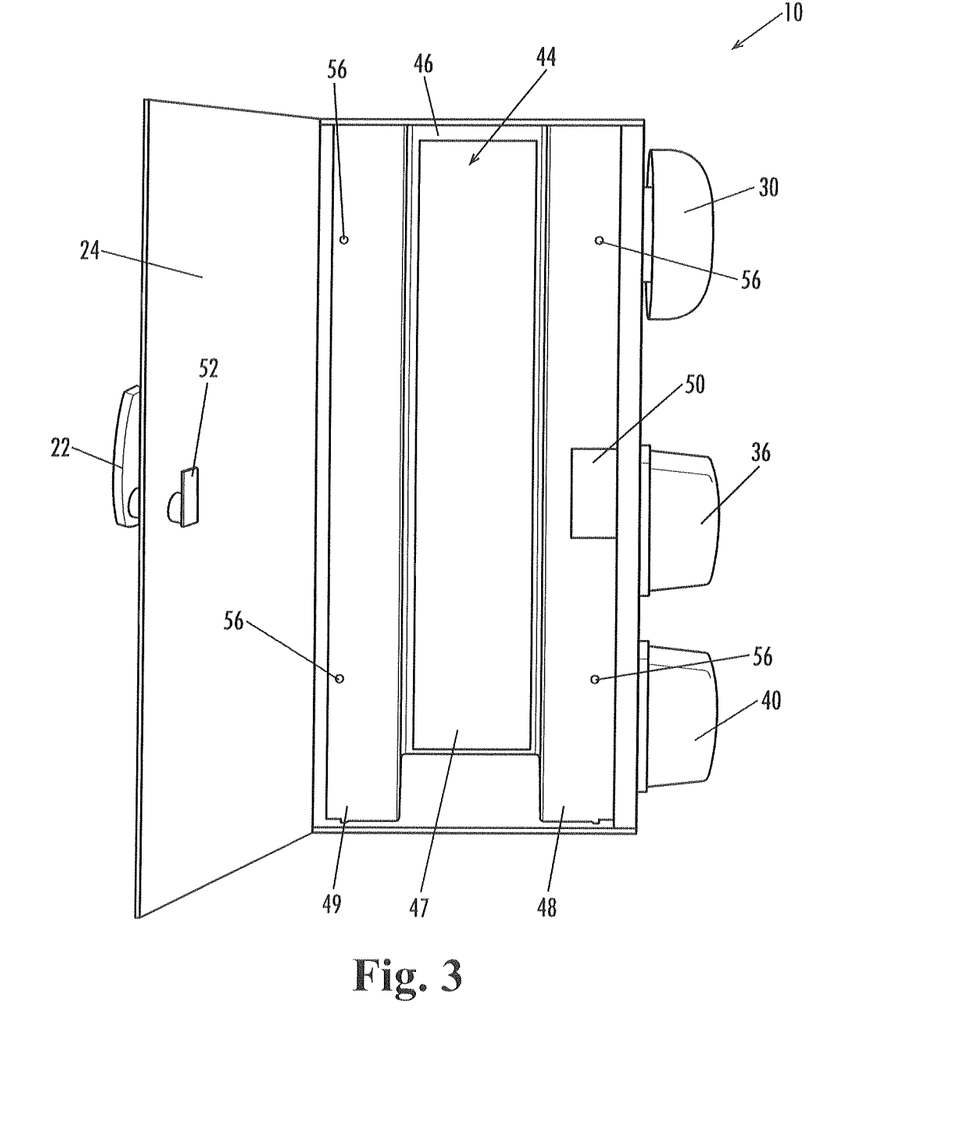
FIG. 3 is an elevation view of the front side of the temporary power distribution panel of FIG. 1, showing the cabinet door ajar in order to view the interior fire extinguisher storage space.

With reference to FIG. 3, an elevation view of the front side of the temporary power distribution panel 10 is shown, with the cabinet door 24 ajar in order to illustrate the interior fire extinguisher storage space 44. As shown, the door 24 has an exterior handle 22 and corresponding interior door latch 52 which raises and lowers in position when the handle 22 is rotated. The interior door latch 52 cooperates with a door latch striker 50. This allows the door 24 to be securely closed and remain closed until a user desires to open it by turning the handle 22.

The interior storage space (fire extinguisher closet) 44 is defined by a removable continuous partition 46. The removable partition 46 has a central U-shaped portion 47 flanked by two wing portions 48, 49 extending transversely to the U-shaped portion. The removable partition 46 is removably secured through the use of a plurality of fasteners 56 such as screws. Interior wiring connecting the power inlet 12 and the power outlets, the alarm bell 30 and the alarm bell power switch 26, is thus hidden (and protected) by the partition. In this way, the partition protects the wiring from damage or abuse by the user. It also protects the user against shocks that could occur from contacting the wiring. The partition 46 defines a storage space 44 defined by the partition is particularly suitable for storing a fire extinguisher of commonly available size and shape.

Figure 4:
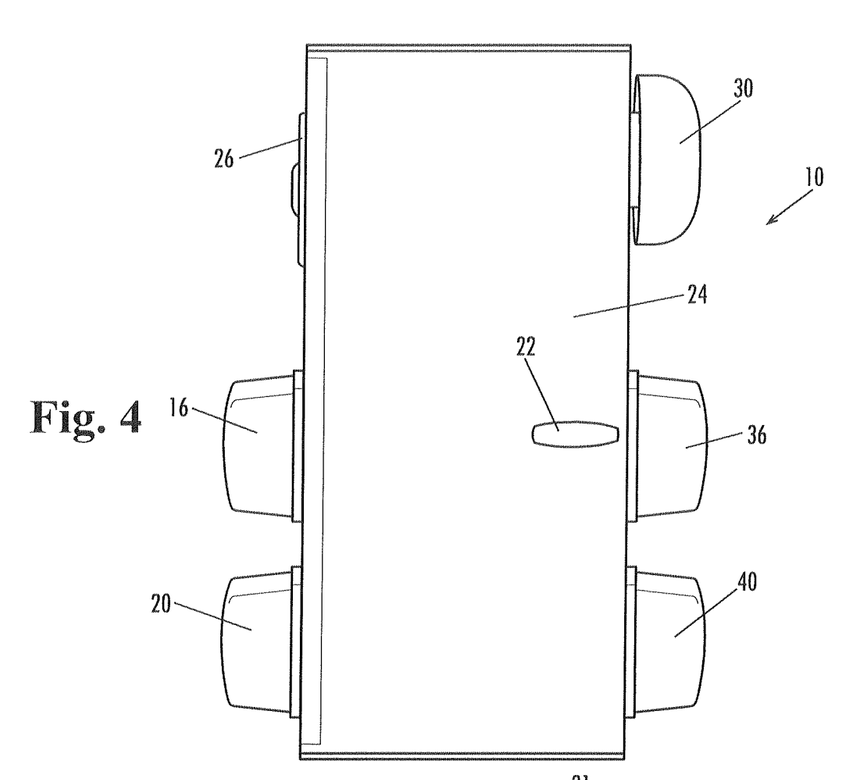
FIG. 4 is a planar view of the front side of the temporary power distribution panel of FIG. 1, showing the cabinet door closed.

With reference to FIG. 4, an elevation view of the front side of the temporary power distribution panel 10 shows the cabinet door 24 closed. As shown, it is contemplated that the alarm bell 30 is mounted to an opposite side of the panel 10 from the alarm bell switch 26. Further shown, power outlets are mounted on both of the left and right opposite sides of the panel 10.

Figure 5:
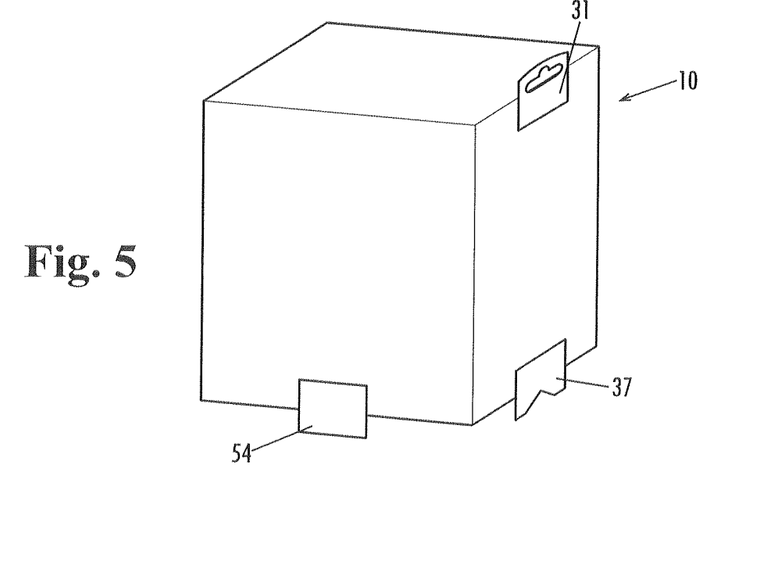
FIG. 5 is a perspective view of the temporary power distribution panel of FIG. 1, showing an alternative embodiment of additional support legs extending from the base.

With reference to FIG. 5, a perspective view of the temporary power distribution panel 10 shows the optional feature of support legs 54 extending from the base (in this regard, the rear leg with the V-notch is optional as well). As contemplated, the support legs 54 help hold the lower portion of the panel 10 above the ground, if the panel is rested on the ground. The support legs 54 may provide additional support to the lower hanger 37. It is contemplated that support legs 54 may be mounted to each of the four sides of the panel 10, as desired. By the provision of such legs, the power distribution panel can be placed upon the ground or floor and protected against damaging contact with water that might be on the floor or ground.

Figure 6:
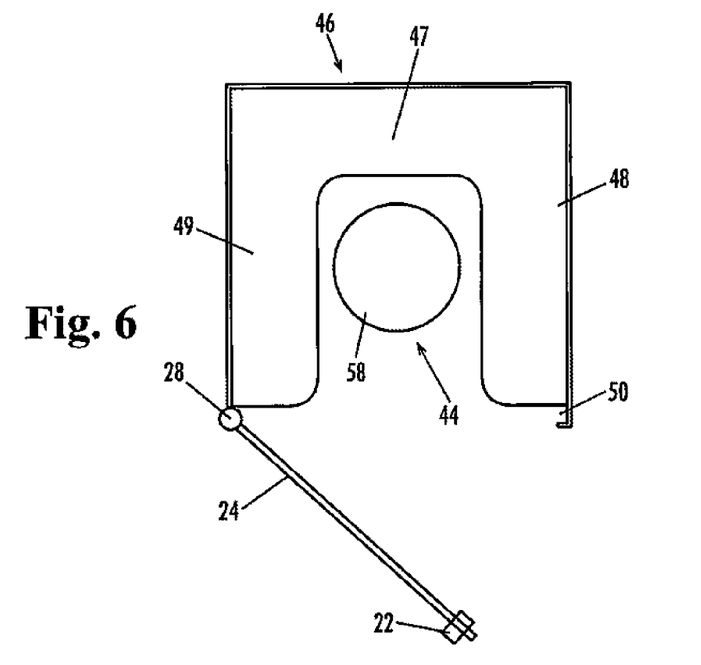
FIG. 6 is a cross sectional top plan view of the temporary power distribution panel of FIG. 1 showing the interior U-shaped portion.

With reference to FIG. 6, a cross sectional top plan view of the temporary power distribution panel 10 further shows the interior U-shaped portion 47. As shown, a fire extinguisher 58 is placed within the fire extinguisher storage space 44.

As shown in FIG. 2, the temporary power distribution panel 10 is shown to alternatively have a heat sensor 60 mounted to the exterior of one of the four sides or the top of the panel 10. The heat sensor 60 is connected to the alarm bell 30 through wiring. The heat sensor 60 detects temperature approximately of the level of fire and automatically activates the alarm bell 30. The heat sensor 60 automatically deactivates the alarm bell 30 when the temperature detected falls below the approximate level of fire, or it can be manually deactivated by a user.

Figure 7:
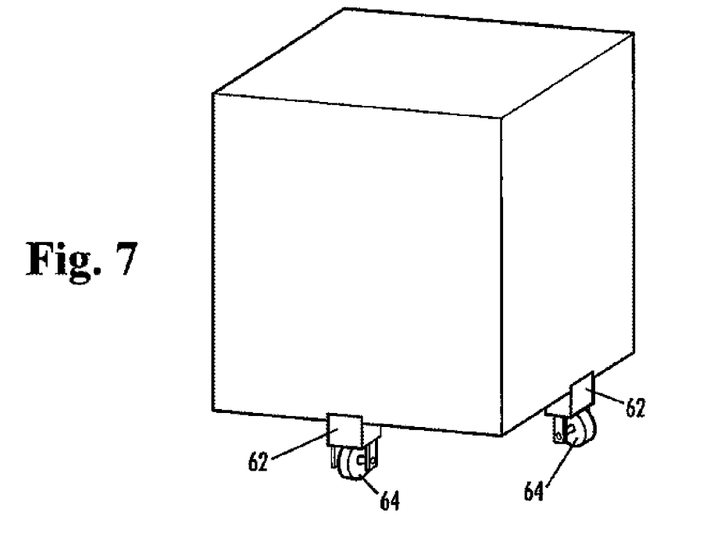
FIG. 7 is a perspective view of the temporary power distribution panel of FIG. 1, as viewed from the rear side showing feet and casters mounted to the base.

As shown in FIG. 7, the temporary power distribution panel 10 is alternatively shown to have a set of feet 62 mounted to the base of the panel 10. As shown, two feet 62 are present, however, it is contemplated that a total of four feet can be utilized. Each foot 62 can be mounted to an edge of the base of the panel. Each foot 62 is shown to have at least one, but can have more than one, casters 64 so that the panel 10 can be set on the ground and moved easily from one location to another. The feet 62 are contemplated to be made of a material which can withstand high temperature, such as metal or wood.

Figure 8:
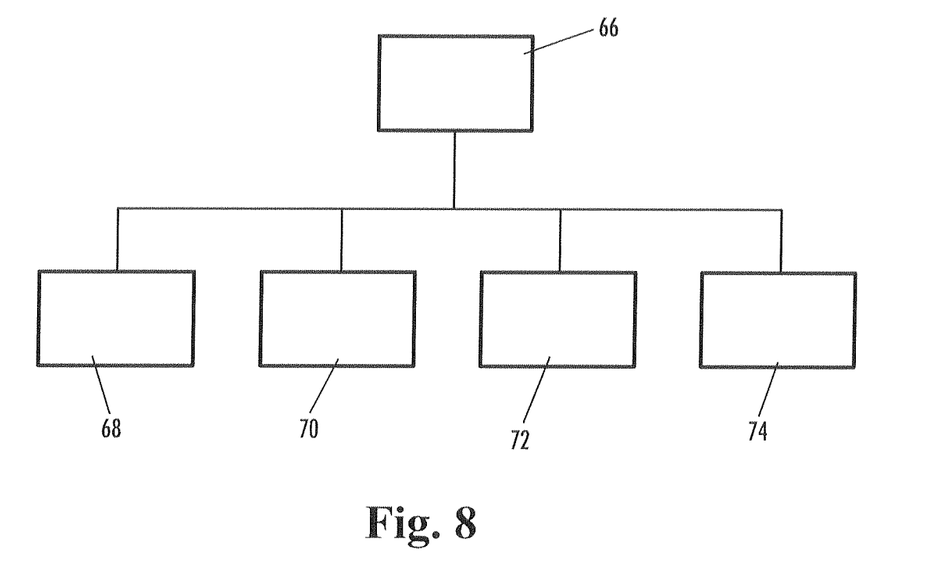
FIG. 8 is a diagram showing a connection between a relay switch incorporated into the temporary power distribution panel of FIG. 1 and further alternative devices on a worksite.

As shown in FIG. 8, in a further alternative embodiment, at least one relay switch 66 is contemplated to connect the panel 10 with additional panels 68 on the worksite. Each switch 66 is further contemplated to connect the panel 10 with a building's alarm system 70. Each switch 66 is further still contemplated to connect the panel 10 with a central monitoring station 72 of a building. Each switch 66 is further still contemplated to connect the panel 10 to an existing building's alarm system 74 such that the alarm system can activate other alarms in panels 10 which are additionally connected to the building's alarm system 74.

Figure 9:
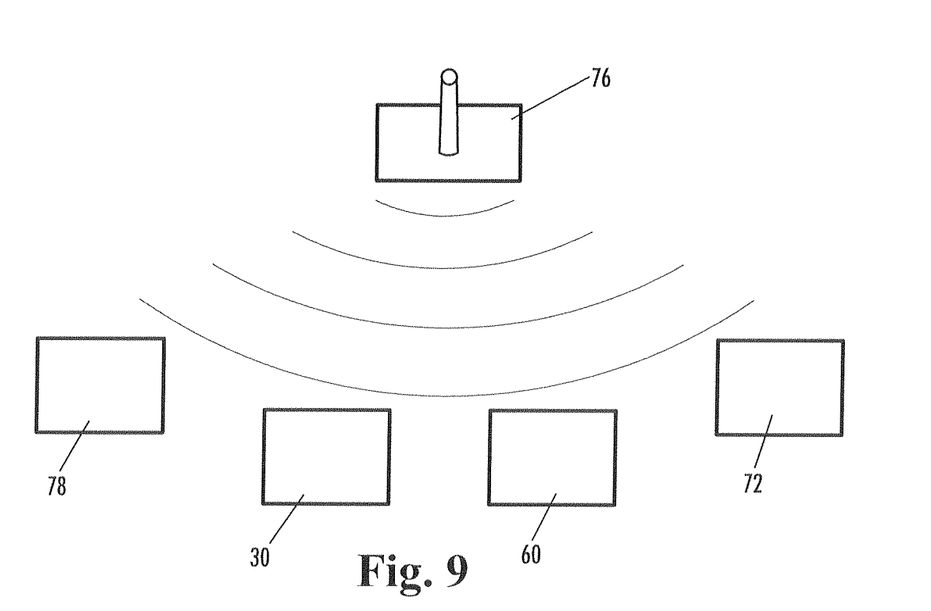
FIG. 9 is a diagram showing a wireless connection between a wireless communication device incorporated into the temporary power distribution panel of FIG. 1 and further devices on a worksite.

As shown in FIG. 9, in a further alternative embodiment, a wireless communication device 76 can be provided between a user 78 in a remote location and the panel 10. A preferred means for this communication is Bluetooth™ technology. Bluetooth™ wireless technology is a short-range communications technology intended to replace the cables connecting portable and/or fixed devices while maintaining high levels of security. This additional embodiment allows a user to wirelessly activate and deactivate the alarm bell 30 or receive notification from the above described heat sensor 60. It is further contemplated that the wireless device can provide connection between a user and the above described building central monitoring system.

While the invention has been described with reference to preferred and example embodiments, it will be understood by those skilled in the art that a variety of modifications, additions and deletions are within the scope of the invention, as defined by the following claims.

What is claimed is:

1. A temporary power distribution panel for use at a construction site and comprising:
    a box-like cabinet with an interior, an exterior, and a rear side, the box-like cabinet defining an interior fire extinguisher closet for receiving a fire extinguisher therein;
    upper and lower hangers positioned on the rear side of the box-like cabinet for hanging the cabinet on a wall or post, wherein the lower hanger comprises a support leg for supporting the cabinet above a surface, and wherein the upper hanger comprises a carrying handle for carrying the cabinet from place to place;
    a fire extinguisher removably received within the interior fire extinguisher closet;
    a movable door for covering and uncovering the fire extinguisher closet to provide access to the fire extinguisher in the event of a fire;
    an electric power inlet for electrically coupling to a source of electric power;
    a plurality of electric power outlets for providing electric power to the construction site and internally coupled to the electric power inlet;
    an emergency alarm bell; and
    an emergency alarm bell arming switch for manually activating the emergency alarm bell, wherein the emergency alarm bell arming switch includes shutoff deterrence to require additional time and difficulty in disarming the emergency alarm bell.

2. A temporary power distribution panel as claimed in claim 1 further comprising one or more additional support legs, with the support legs collectively being provided for supporting the interior of the cabinet several inches or more above the ground or floor.

3. A temporary power distribution panel as claimed in claim 1 further comprising a removable partition for defining the fire extinguisher closet and for protecting the remainder of the interior of the cabinet from exposure.

4. A temporary power distribution panel as claimed in claim 1 wherein the box-like cabinet has a substantially flat top.

5. A temporary power distribution panel for use at a construction site and comprising: a box-like cabinet with an interior, an exterior, and a rear side, wherein the box-like cabinet has a substantially flat top, the box-like cabinet having upper and lower hangers positioned on the rear side of the cabinet, the upper hanger being adapted for securing the cabinet to a post, wall, or wall stud, the box-like cabinet defining an interior fire extinguisher closet with a fire extinguisher therein, a removable partition within the interior for defining the fire extinguisher closet and for protecting the remainder of the interior of the cabinet from exposure, a movable door for covering and uncovering the fire extinguisher closet, and wherein the upper hanger is adapted to be useful as a carrying handle and the lower hanger comprises at least one support leg for supporting the cabinet upon the ground or floor; an electric power inlet for electrically coupling to a source of electric power; a plurality of electric power outlets for providing electric power to the construction site and internally coupled to the electric power inlet, an emergency alarm bell and arming switch, and at least one relay switch, wherein the relay switch connects the panel alarm with a device selected from the group consisting of: a building existing alarm system, a building central monitoring system, and a further panel alarm.

6. A temporary power distribution panel for use at a construction site and comprising:
    a box-like cabinet with an interior, an exterior, and a rear side having upper and lower hangers positioned on the rear side of the cabinet for securing the cabinet to a post, wall, or wall stud;
    an electric power inlet for electrically coupling to a source of electric power;
    a plurality of electric power outlets for providing electric power to the construction site and internally coupled to the electric power inlet;
    an emergency alarm bell;
    a heat sensor connected to the emergency alarm bell, wherein the heat sensor activates the emergency alarm bell when a predetermined temperature level is detected by the heat sensor;
    at least one relay switch, wherein the relay switch connects the panel alarm with a device selected from the group consisting of: a building existing alarm system, a building central monitoring system, and a further panel alarm; and
    an emergency alarm bell arming switch for activating the emergency alarm bell, the arming switch including shutoff deterrence to require additional time and difficulty in disarming the emergency alarm bell.

7. A temporary power distribution panel as claimed in claim 6 further comprising a plurality of feet mounted to the base of the cabinet, with each foot having at least one caster.

8. A temporary power distribution panel as claimed in claim 6 further comprising a wireless communication device connected with the emergency alarm bell, wherein the wireless communication device communicates with a device selected from the group consisting of: a building central monitoring system, a building alarm system, and a remote user wireless communication device.

* * * * *